(12) United States Patent
Partain, III et al.

(10) Patent No.: US 6,372,901 B1
(45) Date of Patent: *Apr. 16, 2002

(54) POLYSACCHARIDES WITH ALKYL-ARYL HYDROPHOBES AND LATEX COMPOSITIONS CONTAINING SAME

(75) Inventors: Emmett Malone Partain, III, Bound Brook; George Lewis Brode, II, Bridgewater, both of NJ (US); Richard Charles Hoy, Raleigh, NC (US)

(73) Assignee: Union Carbide Corporation, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/486,370

(22) Filed: Jun. 7, 1995

Related U.S. Application Data

(63) Continuation of application No. 08/363,299, filed on Dec. 23, 1994, now abandoned, which is a continuation of application No. 07/964,896, filed on Oct. 22, 1992, now abandoned, which is a continuation of application No. 07/304,258, filed on Jan. 31, 1989, now abandoned.

(51) Int. Cl.$^7$ ................................................. C08B 11/00
(52) U.S. Cl. ............................ 536/90; 536/93; 536/94; 536/96
(58) Field of Search ............................. 536/1.1, 54, 90, 536/93, 94, 96; 514/54

(56) References Cited

U.S. PATENT DOCUMENTS

| | | |
|---|---|---|
| 1,451,331 A | 4/1923 | Dreyfus |
| 1,483,738 A | 2/1924 | Lilienfeld |
| 1,502,379 A | 7/1924 | Dreyfus |
| 1,683,682 A | 9/1928 | Lilienfeld |
| 1,683,831 A | 9/1928 | Lilienfeld |
| 1,867,050 A | 7/1932 | Balle et al. |
| 1,877,856 A | 9/1932 | Hagedorn et al. |
| 2,067,853 A | 1/1937 | Lorand |
| 2,071,287 A | 2/1937 | Lorand |
| 2,077,066 A | 4/1937 | Lorand |
| 2,087,549 A | 7/1937 | Powers et al. |
| 2,096,114 A | 10/1937 | Lorand |
| 2,098,335 A | 11/1937 | Dreyfus |
| 2,101,032 A | 12/1937 | Lorand |
| 2,102,205 A | 12/1937 | Hakins et al. |
| 2,119,171 A | 5/1938 | Lorand |
| 2,201,663 A | 5/1940 | Ellsworth et al. |
| 2,205,487 A | 6/1940 | Meinel et al. |
| 2,284,282 A | 5/1942 | Hentrich et al. |
| 2,383,361 A | 8/1945 | Bass et al. |
| 3,102,912 A | 9/1963 | Neracher et al. |
| 3,941,751 A | 3/1976 | Breslow |
| 3,971,627 A | 7/1976 | Breslow |
| 4,009,329 A | 2/1977 | Arney et al. |
| 4,065,319 A | 12/1977 | Desmarais |
| 4,076,930 A | 2/1978 | Ellingboe et al. |
| 4,084,060 A | 4/1978 | Glass, Jr. et al. |
| 4,097,667 A | 6/1978 | Holst et al. |
| T976,002 I4 | 11/1978 | Vanderslice |
| 4,127,495 A | 11/1978 | Swinson |
| 4,228,277 A | 10/1980 | Landoll |
| 4,243,802 A | 1/1981 | Landoll |
| 4,281,110 A | 7/1981 | Blount |
| 4,286,964 A | 9/1981 | Seed |
| 4,465,517 A | 8/1984 | Shields |
| 4,485,089 A | 11/1984 | Leipold |
| 4,485,211 A | 11/1984 | Okamoto |
| 4,529,523 A | 7/1985 | Landoll |
| 4,579,667 A | 4/1986 | Echt et al. |
| 4,584,189 A | 4/1986 | Leipold |
| 4,604,217 A | 8/1986 | Lukach et al. |
| 4,650,863 A | 3/1987 | Felcht et al. |
| 4,663,159 A | 5/1987 | Brode, II et al. |
| 4,683,004 A | 7/1987 | Goddard |
| 4,684,704 A | 8/1987 | Craig |

(List continued on next page.)

FOREIGN PATENT DOCUMENTS

| | | |
|---|---|---|
| CH | 0341805 | 10/1959 |
| DE | 0492062 | 2/1930 |
| DE | 0494917 | 4/1930 |
| DE | 0554877 | 7/1932 |
| DE | 3147434 | 6/1983 |
| EP | 0140486 | 5/1985 |
| EP | 0161607 | 11/1985 |
| EP | 0281951 | 9/1988 |
| EP | 0290771 | 11/1988 |
| EP | 0297553 | 1/1989 |
| EP | 0357962 | 3/1990 |
| EP | 0384167 | 8/1990 |
| FR | 0808699 | 2/1937 |
| FR | 1604236 | 12/1968 |
| GB | 0305946 | 2/1930 |
| GB | 0325512 | 2/1930 |
| GB | 0346426 | 11/1931 |
| GB | 1228850 | 4/1971 |
| GB | 1242735 | 8/1971 |
| GB | 2053225 | 2/1981 |
| GB | 2146320 | 4/1985 |
| RU | 0925971 | 5/1982 |

OTHER PUBLICATIONS

Japanese Patent Abstract 60–136522 (A) of Daicel Kagaku Kogyo K.K., by Tooru Shibata.

Research Disclosure 25221, "Elevation of Viscosity by Addition of Alcohol to Hydrophobically Modified Hydroxyethylcellulose/Surfactant Solutions", Apr. 1985.

Research Disclosure 25202, "Substantivity to Hair of Hydrophobically–Modified Hydroxyethylcellulose", Apr. 1985.

(List continued on next page.)

*Primary Examiner*—Elli Peselev

(57) ABSTRACT

Polysaccharides, including hydroxyethyl cellulose, having alkyl-aryl hydrophobic substitution, provide latex compositions, such as paints, with improved rheology and stability. Improved processes for producing such polysaccharides are also provided.

64 Claims, No Drawings

U.S. PATENT DOCUMENTS

| | | |
|---|---|---|
| 4,703,116 A | 10/1987 | Solarek et al. |
| 4,731,162 A | 3/1988 | Solarek et al. |
| 4,734,454 A | 3/1988 | Aihara et al. |
| 4,743,384 A | 5/1988 | Lu et al. |
| 4,784,693 A | 11/1988 | Kirkland et al. |
| 4,799,962 A | 1/1989 | Ahmed |
| 4,841,040 A | 6/1989 | Just et al. |
| 4,845,175 A | 7/1989 | Lo |
| 4,845,207 A | 7/1989 | T'Sas |
| 4,853,437 A | 8/1989 | Lukach et al. |
| 4,868,238 A | 9/1989 | Craig |
| 4,883,536 A | 11/1989 | Burdick |
| 4,883,537 A | 11/1989 | Burdick |
| 4,883,850 A | 11/1989 | Craig |
| 4,892,589 A | 1/1990 | Kirkland et al. |
| 4,902,733 A | 2/1990 | Angerer |
| 4,904,772 A | 2/1990 | Anjun |
| 4,954,270 A | 9/1990 | Butterworth et al. |
| 4,981,959 A | 1/1991 | Diamantoglou |
| 4,981,960 A | 1/1991 | Diamantoglou |
| 4,994,112 A | 2/1991 | Majewicz et al. |
| 4,997,935 A | 3/1991 | Diamantoglou |
| 5,002,985 A | 3/1991 | Andersson et al. ........... 524/44 |
| 5,100,658 A | 3/1992 | Bolich, Jr. et al. |
| 5,106,609 A | 4/1992 | Bolich, Jr. et al. |
| 5,120,838 A | 6/1992 | Just et al. |
| 5,124,445 A | 6/1992 | Just et al. ..................... 536/84 |
| 5,140,099 A | 8/1992 | Bostrom et al. |
| 5,376,709 A | 12/1994 | Lau et al. ..................... 524/44 |
| RE34,904 E | 4/1995 | Just et al. ..................... 524/43 |

OTHER PUBLICATIONS

Research Disclosure 28865, "Sustained Release Matrix Dosage Forms Incorporating Fine Particle Size Hydroxyethylcellulose", Apr. 1988.

Research Disclosure 306101, "Klucel® Hydroxypropylcellulose Dry Tablet Biners", Oct. 1989.

Synthesis, Feb. 1983, pp. 117–119.

POLYSACCHARIDES WITH ALKYL-ARYL HYDROPHOBES AND LATEX COMPOSITIONS CONTAINING SAME

This application is a continuation of prior U.S. application Ser. No. 08/363,299 filing date Dec. 23, 1994, now abandoned which is a continuation of application Ser. No. 07/964,896 filing dated Oct. 22, 1992 now abandoned which is a continuation of application Ser. No. 07/304,258 filing date Jan. 31, 1986 now abandoned.

BACKGROUND OF THE INVENTION

1. Field of the Invention

This invention pertains to novel polysaccharides and their use in latex compositions and processes, and more particularly to polysaccharides having alkyl-aryl hydrophobes, and improved processes for their production in which polysaccharides provide latex compositions with improved rheology and stability.

2. Description of Background Information

Latex compositions typically have additives which modify the rheology or stability of the composition. Polysaccharides, and in particular cellulosics, have been described as additives to latex compositions for various purposes, including as protective colloids, thickeners, stabilizers or other rheology modifiers. For example, U.S. Pat. No. 4,684,704 (Craig) describes latex compositions containing hydrophobically modified, hydroxyethyl cellulose as a protective colloid. U.S. Pat. No. 4,243,802 (Landoll) and U.S. Pat. No. 4,352,916 (Landoll) describe the use of hydrophobically modified, hydroxyethyl cellulose as thickeners, emulsifiers and stabilizers for latex compositions. U.S. patent application Ser. No. 172,432, filed Mar. 24, 1988, entitled "PREPARATION OF AQUEOUS POLYMER EMULSIONS IN THE PRESENCE OF HYDROPHOBICALLY MODIFIED HYDROXYETHYL CELLULOSE", describes emulsion polymerization processes using hydrophobically modified hydroxyethyl cellulose, including alkyl-aryl-substituted materials.

Polysaccharides having aryl substituents are known. For instance, U.S. Pat. No. 1,451,331 (Dreyfus), U.S. Pat. No. 1,502,379 (Dreyfus), U.S. Pat. No. 1,589,607 (Lilienfeld), and U.S. Pat. No. 1,972,135 (Dreyfus) describe hydroxyethyl cellulose with aralkyl, e.g. benzyl, substitution. Japanese Patent Application Publication No. 82-28003 (Nakamura) describes benzyl substituted, quaternary nitrogen-containing cellulosics in cosmetics. U.S. Pat. No. 4,663,159 (Brode, II et al.) describes water-soluble, cationic polysaccharides containing hydrophobes including aralkyl or alkaryl substituents, having various utilities.

SUMMARY OF THE INVENTION

This invention pertains to polysaccharides with alkyl-aryl hydrophobes and to latex compositions and processes using such polysaccharides. The latex composition contains water, latex polymer and water-soluble polysaccharide having alkyl-aryl hydrophobes. A process for improving the rheology of latex compositions is provided using such polysaccharides. Processes for producing these polysaccharides are also provided. One process comprises reacting a polysaccharide ether with an alkyl-aryl hydrophobe containing compound wherein the ether substitution on the polysaccharide provides an increase in the amount of hydrophobe substitution reacted onto the polysaccharide. Another process comprises reacting a polysaccharide with an alkyl-aryl, hydrophobe-containing glycidyl ether compound.

DETAILED DESCRIPTION OF THE INVENTION

Polysaccharides are generally high molecular weight polymers composed of monosaccharide repeating units joined by glycosidic bonds. Alkyl-aryl hydrophobe substitution of polysaccharides are polysaccharides which have one or more alkyl-aryl substituents, with at least about 10, preferably from about 12 to about 24, and most preferably from about 15 to about 18, carbon atoms in the alkyl-aryl group, i.e. hydrophobe. The aryl portion of the hydrophobe may have one or more aryl rings, which may be fused, carbocyclic or heterocyclic, unsubstituted or substituted with other functional groups, such as halogen, nitro, hydroxyl, amino or other substituents. The alkyl portion of the hydrophobe may be straight or branched chain, cyclic or acyclic, saturated or partially unsaturated, unsubstituted or substituted with other functional groups, such as halogen, hydroxyl or other substituents. Alkyl-aryl hydrophobes include both aralkyl or alkaryl groups. Typical hydrophobes include, but are not limited to, one or more of the following: alkaryl such as t-butylphenyl, nonylphenyl or dodecylphenyl; and aralkyl such as phenylhexyl or naphthyldodecyl. Preferred hydrophobes are nonylphenyl and dodecylphenyl.

The degree of hydrophobe substitution, i.e. DS, defined as the average moles of hydrophobe substituent per mole of polysaccharide repeat unit, may vary depending upon the presence of other substituents, type of hydrophobe and type of polysaccharide. Generally, the DS of the hydrophobe is greater than zero, preferably from 0.001 to about 0.1, and most preferably from 0.005 to about 0.03.

The polysaccharides with alkyl-aryl hydrophobes include polymers of repeating units represented by the structural formula:

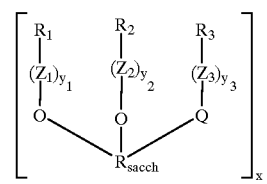

I

In Formula I, for each repeating unit individually:

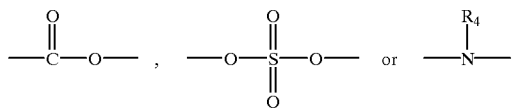

herein $R_4$ is

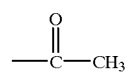

or a mixture of hydrogen and

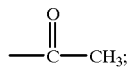

is the residue of a polysaccharide repeat unit and may include additional reactive groups, as in xanthan gum;

x is from about 50 to about 20,000;

each $y_1$, $y_2$ and $y_3$ is 0 or 1;

each $Z_1$, $Z_2$ and $Z_3$ is a divalent connecting segment; and each $R_1$, $R_2$ and $R_3$ is individually a hydrogen, an unsubstituted or a nitrogen-, oxygen-, sulfur- or carboxyl-containing hydrocarbyl group or $R_h$, wherein $R_h$ is an alkyl-aryl hydrophobe, provided that (1) when $R_1$, $R_2$ or $R_3$ is hydrogen then $y_1$, $y_2$ or $y_3$, respectively is 0 and (2) one or more repeating units have one or more $R_1$, $R_2$ or $R_3$ which is $R_h$.

In Formula I, Q is preferably oxygen providing anhydroglucose repeat units, and most preferably cellulose. The number of repeat units, defined by x, is preferably from about 50 to about 20,000 and most preferably from about 250 to about 4,000, providing a molecular weight of from several thousand up to several million. The molecular weight of the polysaccharide may be varied using well established procedures, such as controlled degradation.

In Formula I, the ether substituents, i.e. $(Z_1)_{y_1}$—$R_1$, $(Z_2)_{y_2}$—$R_2$ and $(Z_3)_{y_3}$—$R_3$, are usually hydrogen with some alkyl-aryl hydrophobes, and preferably hydroxyethyl, present. Since only one or more repeating units must have one or more $R_h$, not every polysaccharide repeat unit must have an alkyl-aryl hydrophobe. Generally, only a minor portion of repeat units will have one or more hydrophobes. Typical ether substituents include, but are not limited to, one or more of the following: hydrogen, i.e. —H; unsubstituted hydrocarbyl such as —CH$_3$, —CH$_2$CH$_3$, —CH$_2$C$_6$H$_5$, or —C$_{16}$H$_{33}$; nitrogen-, oxygen-, sulfur- or carboxyl-containing hydrocarbyl such as —CH$_2$CH$_2$OH; —CH$_2$COOH; —CH$_2$COO$^-$Na$^+$ or

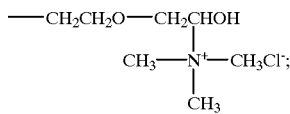

hydrophobes with or without connecting segments, including the alkyl-aryl hydrophobes described previously, such as

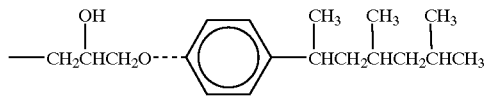

Preferably the ether substituents also include hydroxyethyl, i.e. —CH$_2$CH$_2$OH, in an amount sufficient to provide water solubility.

In Formula I, the divalent connecting segment, represented by $Z_1$, $Z_2$ and $Z_3$, designates the portion of the ether substituent which is provided between the cellulose ether oxygen, or Q group, and the main portion of the substituent, such as an alkyl-aryl group. When $R_1$, $R_2$ or $R_3$ is hydrogen, i.e. when the group represented is an unsubstituted hydroxyl, there is no connecting segment and $y_1$, $y_2$ or $y_3$ is correspondingly 0. When $R_1$, $R_2$ or $R_3$ is not hydrogen, then a connecting segment may or may not be provided. Generally, the connecting segment represents the residual portion of the compound used to provide an alkyl-aryl substituent on the polysaccharide, which portion is not the alkyl-aryl group per se. Typical connecting segments, when present, include, but are not limited to: unsubstituted or hydroxy-substituted alkyl or alkoxy groups such as methylene, i.e. —CH$_2$—, ethoxy, i.e. —CH$_2$CH$_2$O—, or glycidyl ethers, i.e.

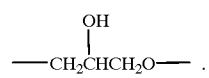

Preferably, the connecting segment is absent or present as —CH$_2$— or most preferably as

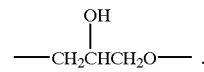

The polysaccharide may contain additional substitution, i.e. other than the hydrophobes, such as may be required to provide the requisite water solubility or other properties. The other substituents may be ionic or nonionic providing nonionic, cationic, anionic or amphoteric polysaccharide. Typical additional substituents include, but are not limited to, one or more of the ether substituents described previously. The amount of additional substitution, i.e. molar substitution defined as the average moles of such substituent per mole of polysaccharide repeat unit, designated MS, is not critical but may be any amount desired. Preferably, the polysaccharide will have a hydroxyethyl MS sufficient to provide water solubility, if needed, and/or improved enzyme reistance if desired. Hydroxyethyl MS may generally be from about 1.5 to about 6, and preferably from about 3 to about 5.

The hydrophobe-substituted polysaccharides can be produced from readily available polysaccharide starting materials. These materials include naturally occurring, biosynthesized and derivatized carbohydrate polymers or mixtures thereof. The type of polysaccharide is not critical and includes the entire starch and cellulose families; pectin; chitosan; chitin; the seaweed products such as agar and carrageenan; alginate; the natural gums such as guar, arabic, and tragacanth; bio-derived gums such as dextran and xanthan; and other known polysaccharides. Preferred polysaccharides are cellulosics, including cellulose ethers, which may be derived from conventional materials, such as chemical cotton, cotton linters, wood pulp, alkali cellulose, as well as ether derivatives of these materials.

Cellulose ethers which may be used include, but are not limited to, one or more of the following: hydroxyethyl cellulose; hydroxypropyl cellulose; methyl cellulose; carboxymethyl cellulose; carboxyethyl cellulose; hydroxypropyl ethyl cellulose; hydroxyethyl carboxymethyl cellulose; and the like. A particularly preferred polysaccharide is hydroxyethyl cellulose.

Any reaction condition sufficient to modify the polysaccharide with the hydrophobes may be used, including well established etherification procedures, such as described in U.S. Pat. No. 4,663,159 (Brode, II, et al.) or U.S. Pat. No. 4,228,277 (Landoll). This reaction may be conducted using any compound having the hydrophobe and a functional group which reacts with the polysaccharide. Typical functional groups include, but are not limited to, one or more of the following: halides, such as chlorides or bromides; oxiranes, such as epoxides including glycidol and its esters; acids, including esters, acid halides or salts thereof, such as carboxylic acids or sulfates; (thio)isocyanates; and halohydrins. Alkyl-aryl halides may be used but may not be desirable due to problems with corrosivity and having to remove halides from the product. Preferably a glycidyl ether, such as nonyl- or dodecylphenyl glycidyl ether, is used.

The hydrophobe substitution reaction may be conducted at any desired temperature, typically between 20° C. to 125°

C. and preferably from about 55° C. to about 95° C., for a time sufficient to provide the desired amount of substituents, typically from about 0.5 hour to about 12 hours or more and preferably from about 1 to 6 hours. The reaction may be conducted with diluent, solvent or catalyst as desired and is typically done in an inert medium in the presence of a caustic catalyst, such as an alkali metal hydroxide or the like material.

In a preferred embodiment, the hydrophobe substitution is conducted by reacting a compound, having an alkyl-aryl group with a polysaccharide ether containing another substituent, such as hydroxyethyl, in an amount which increases the efficiency of hydrophobe substitution. The MS of other ether substitution, i.e. $MS_E$, may vary depending upon the types of polysaccharide, hydrophobe and other ether substituents present and is generally at least that amount which provides increased hydrophobe substitution as compared to an $MS_E$ of 0. In embodiments when the polysaccharide is cellulose and the other ether substituent is hydroxyethyl, $MS_E$ may range from greater than 0, preferably from about 1.5 to about 6 and most preferably from about 3.5 to about 5 average moles of other ether substituent per mole of polysaccharide repeat unit.

In another preferred embodiment, the hydrophobe substitution is conducted using an alkyl-aryl compound having a functional group which is a glycidyl ether. Such compounds may be represented by the structural formula:

II wherein $R_h$ is an alkyl-aryl hydrophobe as defined previously, in Formula I. Substitutions using such compounds have been found to provide higher reaction efficiencies when compared to other functional groups, including the closely related, corresponding epoxides, such as represented by the structural formula:

III wherein $R_h$ is as previously defined. While not bound to any particular theory, the increased reaction efficiencies provided by alkyl-aryl glycidyl ethers may be due to higher reactivity of glycidyl ether groups to nucleophilic attack by the polysaccharide. Consequently, increased reaction efficiencies may be exhibited by other glycidyl ethers, including linear or branched alkyl glycidy, ethers, such as hexadecyl glycidyl ether, as compared to the corresponding alkyl epoxides, such as 1,2-epoxyhexadecane.

In a typical procedure the hydrophobe substitution reaction is carried out in a slurry of the desired polysaccharide in an appropriate aqueous diluent system. Suitable diluents include, but are not limited to, isopropyl alcohol, t-butyl alcohol, sec-butyl alcohol, propyl alcohol, ethanol, methanol, methylethylketone, water, tetrahydrofuran, dioxane, 2-butoxyethanol, 2-ethoxyethanol, acetone, and mixtures of these materials. Suitable weight ratios of diluent to polysaccharide are in the range of about 4:1 to 25:1. Because the reaction is generally carried out heterogeneously, it is important that the diluent system normally not be a solvent for either the starting polysaccharide or the hydrophobe-modified product.

The polysaccharide may be causticized with a suitable caustic catalyst such as sodium hydroxide, potassium hydroxide or lithium hydroxide, with sodium hydroxide being preferred. The molar ratio of caustic to polysaccharide may suitably vary between 0.4 to 2.0. Many polysaccharides that are in contact with any base may be readily degraded by oxygen. It is accordingly necessary to exclude oxygen from the reaction vessel during the time in which caustic is present. It is suitable to carry out the reaction under an inert gas such as nitrogen.

After being causticized with a suitable amount of caustic catalyst, the hydrophobic reactant may be added, and the reaction is conducted at a suitable temperature for a time sufficient to provide the desired amount of substitution. Alternately, the polysaccharide may be first reacted with one or more appropriate electrophiles to render the polysaccharide water soluble followed by a sequential reaction with the hydrophobic reactant, or the polysaccharide may be simultaneously reacted with one or more electrophiles and the hydrophobic reactant. Suitable electrophiles include ethylene oxide, propylene oxide, chloroacetic acid and its salts, 1,3-propane sultone, methyl chloride, ethyl chloride, glycidol, 3-chloro-1,2-propanediol, and 2-chloroethanol.

Latex compositions can be provided having as essential components: water; latex polymer; and the polysaccharide. The kind and amount of latex polymer is not critical, and may be provided based on well established procedures. Typical latex polymers include, but are not limited to, various types such as the following: acrylics; alkyds; celluloses; coumarone-indenes; epoxys; esters; hydrocarbons; maleics; melamines; natural resins; oleo resins; phenolics; polyamides; polyesters; rosins; silicones; styrenes; terpenes; ureas; urethanes; vinyls; and the like. Illustrative latex polymers include, but are not limited to, one or more homo- or copolymers containing one or more of the following monomers: (meth)acrylates; vinyl acetate; styrene; ethylene; vinyl chloride; butadiene; vinylidene chloride; vinyl versatate; vinyl propionate; t-butyl acrylate; acrylonitrile; neoprene; maleates; fumarates; and the like, including plasticized or other derivatives thereof.

The amount of polysaccharide which may be used in the latex composition is not narrowly critical. In the broadest sense, the amount of polysaccharide is that which is an effective amount in providing improved rheology or stability to the latex composition. Typically, the amount of polysaccharide is at least about 0.05, preferably from about 0.15 to about 3, and most preferably from about 0.25 to about 1.5 weight percent of the latex composition.

The amount of latex polymer used in the latex composition is not critical, but may be any amount following well established procedures using latex polymers. Typically, the amount of dry latex polymer is at least about 1, preferably from about 2 to about 50, and most preferably from about 3 to about 40 weight percent of the total latex composition.

The latex composition may optionally contain other components such as those generally used in latex compositions. Typical components include, but are not limited to, one or more of the following: solvents such as aliphatic or aromatic hydrocarbons, alcohols, esters, ketones, glycols, glycol ethers, nitroparaffins or the like; pigments; fillers, dryers; flatting agents; plastisizers; stabilizers; dispersants; surfactants; viscosifiers including polymeric associative thickeners, polysaccharide-based thickeners and so on; suspension agents; flow control agents; defoamers; antiskinning agents; preservatives; extenders; filming aids; crosslinkers; surface improvers; corrosion inhibitors; and other ingredients useful in latex compositions.

Processes for producing latex compositions having improved rheology and stability can be provided by combining the latex polymer and polysaccharide with water following established procedures.

Although not bound by any particular theory it is believed that the polysaccharides control the rheology of the latex composition by two mechanisms. As with other cellulosics, the aqueous phase of the composition is thickened by the presence of a large hydrodynamic volume resulting from the relatively high molecular weight and water of hydration surrounding the polysaccharide. The alkyl-aryl substitution also thickens the latex composition by an associative mechanism wherein the hydrophobes interact with each other and hydrophobic portions of the latex polymer or other ingredients present resulting in improved properties such as high viscosity at low shear, improved spatter resistance and improved flow and leveling, while avoiding problems with syneresis, color acceptance, color development and viscosity stability.

Latex compositions and processes using the polysaccharides are provided whereby the polysaccharide may be used as a protective colloid, thickener, stabilizer or other rheology modifier, such as for emulsion polymerization.

The polysaccharide may also be used in a variety of applications other than in latex compositions and processes. Additional applications include, but are not limited to: cosmetics, such as shampoos; biomedicine such as in oral care including toothpaste or in pharmaceuticals including timed- or controlled-release formulations; detergents such as in laundry or surface cleaners; various other timed-release applications including pesticides; and other areas in which a protective colloid, stabilizer, thickener or rheology modifier is desired.

This invention is further illustrated in the following examples, which are merely representative of various embodiments within the scope of the claims. Unless stated otherwise, all percentages correspond to weight percent.

EXAMPLES

The designations and abbreviations used in the examples are defined as follows:

| Designation | Description |
|---|---|
| $C_{16}$ Epoxy | 1,2-epoxyhexadecane (CAS#7320-37-8). |
| EO | Ethylene oxide. |
| NPGE | Nonylphenyl glycidyl ether, distributed under the trademark of HELOXY ® WC-64 by Wilmington Chemical Company. |
| Wood pulp | Commercially flocked RAYONIER ® X-F, ETHANIER ® F or ETHANTZR ® F-HV wood pulp, as specified. |
| SLS | Sodium lauryl (dodecyl) sulfate. |
| HEC-1 | Hydroxyethylcellulose, prepared from wood pulp, having an EO MS of about 3.5. |
| HEC-2 | Hydroxyethylcellulose, having a 5% solution viscosity (Brookfield, spindle #1, 30 rpm) of about 125 cP, available from Union Carbide Corporation under the tradename of CELLOSIZE ® QP-09L. |
| HEC-3 | Hydroxyethylcellulose, having a 2% solution viscosity (Brookfield, spindle #2, 30 rpm) of about 400 cP, available from Union Carbide Corporation under trademark of CELLOSIZE ® WP-300. |
| HEC-4 | Hydroxyethylcellulose, having a 1% solution viscosity (Brookfield, spindle #3, 30 rpm) of about 400 cP, available from Union Carbide Corporation under trademark of CELLOSIZE ® ER-4400. |
| GTMAC | A 70% aqueous solution of glycidyl trimethylammonium chloride, available from Degussa under the trademark of QUAB-151. |
| SCA | Sodium chloroacetate. |

The following test procedures describe the characterization of the polysaccharides with alkyl-aryl hydrophobes, and define the performance tests used in their evaluation.

EO MS: The molar substitution of EO in the polysaccharides is determined from the mass gain of the product, corrected for ash and volatiles. EO MS is given by:

$$EO\ MS = \frac{Mf - 25.0}{44.0} \times \frac{162}{25}$$

where Mf is the total mass of product, corrected for ash and volatiles.

NPGE DS: Approximately 0.2 g of the polysaccharide (weighed to the nearest 0.1 mg, recorded as m, and corrected for volatiles and ash) is dissolved in water containing 0.5 g of 30% aqueous SLS and diluted to 50.00 ml. The ultraviolet spectrum from 300 to 240 nm is recorded, and the absorbance at 278 nm is recorded as A (corrected for the baseline, e=1530 $M^{-1}cm^{-1}$) The EO MS is given by y, so that the NPGE DS is given by:

$$NPGE\ DS = \frac{50.00 \times (162 + 44 \times y) \times A}{1530 \times 1000 \times m}$$

1% Viscosity: Viscosity, in centipoise, of an aqueous solution of the polysaccharide at 1% measured using a Brookfield viscometer, model LVT, spindle #2, at 30 rpm and 25° C.

Stormer viscosity: ASTM Method D 562.

ICI viscosity: Viscosity, in poise, measured on the final latex paint formulation using an ICI Cone and Plate Viscometer, Model VR-4000.

Brookfield viscosity: ASTM Method D 2196-81. The data in Table 2 are divided by 1000, so that, for example, 25.3 is equivalent to 25,300 cP.

Sag resistance: ASTM Method D 4400-84.

Leveling: ASTM Method D 4062-81.

Contrast ratio: A 4 mil wet film of the latex paint is cast onto an opacity chart (Leneta, 3B Opacity chart) and allowed to dry for 24 hours. The percent reflectance of the paint over the black portion (Rb) and white portion (Rw) of the chart is recorded. The contrast ratio is reported to three significant figures, and is given by:

$$\text{Contrast ratio} = \frac{Rb}{Rw}$$

Spatter resistance: ASTM Method D 4707-87.

Examples 1–35

Polysaccharide Substitution

Various polysaccharides with alkyl-aryl hydrophobes are prepared using one of several procedures, i.e. Synthesis Methods A, B, C, D or E. The specific preparations are set forth in Table I.

Synthesis Method A

A three pint glass pressure reactor is charged with 25.0 g of wood pulp in the designated diluent system. The mixture is stirred for one hour while purging the head space of the reactor with nitrogen to remove any entrained oxygen. After 30 minutes, the reactor is warmed to 32° C.

While at 32° C., 22% aqueous sodium hydroxide is added under nitrogen. The slurry is then stirred at 35° C. under nitrogen for one hour. Freshly distilled EO is added to the reactor, which is then sealed and heated to 75° C. Timing of the ethoxylation is begun at the onset of 75° C.

Thirty minutes after reaching 75° C., a solution of 30% hydrogen peroxide in 5 ml of water is added. The reaction is continued at 75° C. for 2.5 hours. NPGE is added to the reactor and the injection line is rinsed with 10 ml of acetone. The reaction is continued at 75° C. for six more hours. The total reaction time at 75° C. is nine hours.

The reactor is cooled to room temperature and 9.5 g of glacial acetic acid is added. The mixture is stirred for 15 minutes, and the polysaccharide is recovered by vacuum filtration. The polysaccharide is washed in a Waring blender: five times with 500 ml of 5:1 (by volume) acetone/water, and twice with 500 ml of acetone. The polymer is dried overnight in vacuo at 50° C.

Synthesis Method B

A three pint glass pressure reactor is charged with 25.0 g of wood pulp, 353.3 g of acetone, 37.0 g of water, and 59.7 g of ethanol. The mixture is stirred for one hour while purging the head space of the reactor with nitrogen to remove any entrained oxygen. After 30 minutes, the reactor is warmed to 32° C.

While at 32° C., 22% aqueous sodium hydroxide is added under nitrogen. The slurry is then stirred at 35° C. under nitrogen for one hour. NPGE and freshly distilled EO in 16 ml of acetone are added to the slurry. The reactor is sealed, and the mixture is heated at 75° C. for twelve hours. The reactor is then cooled, and 4.00 g of glacial acetic acid is added. After stirring the slurry for 15 minutes, the product is isolated and washed as described in Method A.

Synthesis Method C

A three pint glass pressure reactor is charged with wood pulp, acetone, ethanol, and water as described in Method A. The mixture is stirred for one hour while purging the head space of the reactor with nitrogen, and warmed to 32° C., as described in Method A.

While at 32° C., 22% aqueous-sodium hydroxide is added under nitrogen. The slurry is then stirred at 35° C. under nitrogen for one hour. Freshly distilled EO is added to the reactor, which is then sealed and heated to 75° C. After one hour, the reactor is cooled to 25° C., 11.2 g of glacial acetic acid is added, and the slurry stirred for 5 minutes. Then, NPGE and the second charge of freshly distilled EO are added to the slurry. The reactor is sealed, and the mixture is heated at 75° C. for six hours.

The slurry is cooled, and 5.6 g of 50% aqueous sodium hydroxide is added to the slurry. After stirring ten minutes, a solution of hydrogen peroxide in 10 ml of water is added, and the mixture is heated at 55° C. for one hour. The mixture is cooled, 12.0 g of glacial acetic acid is added, and the slurry is stirred for 15 minutes.

The product is then isolated and washed as described in Method A.

Synthesis Method D

A three pint glass pressure reactor is charged with 25.0 g of wood pulp and the designated diluent system. The mixture is stirred for one hour while purging the head space of the reactor with nitrogen to remove any entrained oxygen. After 30 minutes, the reactor is warmed to 32° C.

While at 32° C., 22% aqueous sodium hydroxide is added under nitrogen. The slurry is then stirred at 35° C. under nitrogen for one hour. Freshly distilled ethylene oxide is added to the reactor, which is then sealed and heated to 85° C. Timing of the ethoxylation is begun at the onset of 85° C.

Thirty minutes after reaching 85° C., a solution of 30% hydrogen peroxide in 5 ml of water is added. The reaction is continued at 85° C. for 1.5 hours. NPGE is added to the reactor, and the injection line is rinsed with 10 ml of acetone. The reaction is continued at 85° C. for three more hours. The total reaction time at 85° C. is five hours.

The reactor is cooled to room temperature and 9.5 g of glacial acetic acid is added. The mixture is stirred for 15 minutes, and the polysaccharide is recovered by vacuum filtration. The polysaccharide is washed in a Waring blender: five times with 500 ml of 5:1 (by volume) acetone/water, and twice with 500 ml of acetone. The polymer is dried overnight in vacuo at 50° C.

Synthesis Method E

A 250 ml. three-necked round bottomed flask is fitted with a stirring paddle and motor, a rubber serum cap, a nitrogen inlet, a pressure-equalizing addition funnel, and a Friedrich condenser with a mineral oil bubbler. The flask is charged with the designated polysaccharide and diluent.

The slurry is stirred for one hour while purging the head space of the reactor with nitrogen to remove any entrained oxygen. Aqueous sodium hydroxide solution (50%, by weight) is added to the slurry under nitrogen, and the slurry is stirred under nitrogen for one hour. Heat is applied to the slurry up to 55° C. and NPGE, and other reactant as noted in Table 1, are added to the slurry under nitrogen.

The mixture is maintained at 55° C. for the specified time, cooled to ambient temperature, and neutralized with 4.0 g of glacial acetic acid. After stirring for 15 minutes, the product was collected by vacuum filtration and washed and dried as described previously.

TABLE 1

Hydrophobe-Substituted Polysaccharide Synthesis

| Example | Synthesis Method | Polysaccharide Type | Diluent | Caustic (g) | EO (g) | NPGE (g) | Peroxide (g) | Product Yield (g) |
|---|---|---|---|---|---|---|---|---|
| 1 | C | F-HV | H$_2$O/EtOH/Ace[a] | 43.2 | 16.2/30.3 | 10.0 | 2.70 | 51.37 |
| 2 | B | F-HV | H$_2$O/EtOH/Ace | 11.4 | 47.5 | 3.3 | 0.30 | 51.86 |
| 3 | A | XF | H$_2$O/EtOH/Ace[a] | 21.5 | 46.0 | 3.0 | — | 56.18 |
| 4 | A | XF | H$_2$O/EtOH/Ace[a] | 21.5 | 47.5 | 5.0 | — | 55.66 |
| 5 | A | F-HV | H$_2$O,EtOH/Ace[a] | 11.4 | 40.0 | 5.0 | 0.30 | 56.62 |

TABLE 1-continued

Hydrophobe-Substituted Polysaccharide Synthesis

| Example | Synthesis Method | Polysaccharide Type | Diluent | Caustic (g) | EO (g) | NPGE (g) | Peroxide (g) | Product Yield (g) |
|---|---|---|---|---|---|---|---|---|
| 6 | A | F-HV | H$_2$O/EtOH/Ace[a] | 21.6 | 32.0 | 5.0 | 0.20 | 48.54 |
| 7 | A | F-HV | H$_2$O/EtOH/Ace[a] | 21.6 | 46.0 | 5.0 | 0.20 | 56.35 |
| 8 | A | F-HV | H$_2$O/EtOH/Ace[a] | 21.6 | 31.0 | 9.0 | 0.20 | 48.75 |
| 9 | A | F-HV | H$_2$O/EtOH/Ace[a] | 27.3 | 32.0 | 9.0 | 0.20 | 47.11 |
| 10 | A | F-HV | H$_2$O/EtOH/Ace[a] | 27.3 | 36.0 | 9.0 | 1.00 | 50.71 |
| 11 | A | F-HV | H$_2$O/EtOH/Ace[a] | 27.3 | 36.0 | 9.0 | 0.50 | 50.59 |
| 12 | A | F-HV | H$_2$O/EtOH/Ace[a] | 27.3 | 36.0 | 9.0 | 0.85 | 51.25 |
| 13 | A | F | H$_2$O/Acetone[b] | 27.3 | 52.0 | 7.5 | 0.90 | 60.60 |
| 14 | A | F | H$_2$O/IPA[c] | 27.3 | 46.0 | 7.5 | o.50 | 51.50 |
| 15 | A | F | H$_2$O/TBA[d] | 27.3 | 28.0 | 4.0 | 0.20 | 47.20 |
| 16 | A | F | H$_2$O/EtOH/Ace[e] | 27.3 | 52.0 | 7.5 | 0.90 | 61.70 |
| 17 | A | F | H$_2$O/TBA[d] | 27.3 | 28.0 | 4.6 | 0.20 | 47.30 |
| 18 | A | F | H$_2$O/EtOH/Ace[a] | 27.3 | 36.0 | 7.5 | 0.90 | 50.93 |
| 19 | A | F | H$_2$O/EtOH/Ace[a] | 27.3 | 52.0 | 7.5 | 0.90 | 59.10 |
| 20 | A | F | H$_2$O/EtOH/Ace[a] | 27.3 | 52.0 | 5.0 | 0.70 | 59.57 |
| 21 | A | F | H$_2$O/EtOH/Ace[a] | 27.3 | 44.0 | 6.25 | 0.80 | 56.06 |
| 22 | A | F | H$_2$O/EtOH/Ace[a] | 27.3 | 36.0 | 8.0 | 0.70 | 52.62 |
| 23 | A | F | H$_2$O/EtOH/Ace[a] | 27.3 | 50.0 | 6.35 | 0.70 | 58.89 |
| 24 | A | F | H$_2$O/EtOH/Ace[a] | 27.3 | 36.0 | 8.5 | 0.65 | 51.15 |
| 25 | A | F | H$_2$O/EtOH/Ace[a] | 27.3 | 36.0 | 7.5 | 0.60 | 51.28 |
| 26 | A | F | H$_2$O/EtOH/Ace[a] | 27.3 | 52.0 | 7.5 | 0.60 | 59.10 |
| 27 | A | F | H$_2$O/EtOH/Ace[a] | 27.3 | 44.0 | 8.25 | 0.60 | 54.80 |
| 28 | D | F | H$_2$O/EtOH/Ace[a] | 27.3 | 36.0 | 9.0 | 0.90 | 51.52 |
| 29 | D | F | H$_2$O/EtOH/Ace[a] | 27.3 | 36.0 | 9.0 | 1.10 | 50.99 |
| 30 | D | F | H$_2$O/EtOHlAce[a] | 27.3 | 36.0 | 9.0 | 1.20 | 51.38 |
| 31 | E | HEC-1[f] | H$_2$O/EtOHAce[h] | 1.58 | —[k] | 2.63[l] | 0 | 15.50 |
| 32 | E | HEC-2[f] | H$_2$O/EtOH/Ace[h] | 1.85 | —[k] | 3.1[l] | 0 | 13.10 |
| 33 | E | HEC-3[g] | H$_2$O/IPA[i] | 3.8[j] | —[k] | 2.1[m] | 10.99[o] | |
| 34 | E | HEC-3[g] | H$_2$O/IPA[i] | 9.3[j] | —[k] | 2.1[n] | 0 | 11.63[p] |

[a]Water (47 g), ethanol (49.5 g) and acetone (353 g).
[b]Water (45 g) and acetone (405 g).
[c]Water (36 g) and isopropanol (414 g).
[d]Water (36 g) and t-butanol (414 g).
[e]Water (36 g), ethanol (22 g) and acetone (383 g).
[f]12.4 g.
[g]9.8 g.
[h]Water (7 g), ethanol (12 g) and acetone (68.5 g).
[i]Water (15 g), and isopropanol (95 g).
[j]20.5% concentration.
[k]Ethoxylated starting material.
[l]Reacted for 24 hours.
[m]With GTMAC (5.54 g) and reacted for 8 hours.
[n]With SCA (2.5 g) and reacted for 8 hours.
[o]Having a CS (cationic substitution, by Kjeldahl analysis) of 0.21.
[p]Having a carboxymethyl MS of 0.24.

Examples 35–36

Polysaccharide Ether Enhancement of Hydrophobe Substitution

A 250 ml, three-necked round bottomed flask is fitted with a stirring paddle and motor, a rubber serum cap, a nitrogen inlet, a pressure-equalizing addition funnel, and a Friedrich condenser with a mineral oil bubbler. The flask is charged with HEC, as designated in Table 2, 68.5 g of acetone, 12.0 g of ethanol, and 7.0 g of water.

While stirring the slurry, the headspace of the flask is purged with nitrogen for one hour to remove any entrained oxygen. A 50% aqueous sodium hydroxide solution is added to the slurry by syringe, and the slurry is stirred for 90 minutes. A solution of NPGE in 7.4 g of acetone is then added and the mixture is refluxed at ambient pressure for 24 hours.

The slurry is cooled to room temperature, and a solution of 2.0 g of glacial acetic acid in 15 ml of acetone is added to the slurry with stirring. After 15 minutes, the polysaccharide is recovered by vacuum filtration and washed three times in a Waring blender with 300 ml of acetone.

The polymer is dried in vacuo at 50° C. overnight.

The hydrophobe content, i.e., NPGE DS, is determined using the previously described procedure. It is evident from these experiments that under identical reaction conditions, higher hydrophobe alkylation efficiencies are observed with polysaccharides having higher EO MS values.

TABLE 2

| Example | Polysaccharide Mass | Polysaccharide EO MS | Caustic (g) | Mole Ratio* | NPGE (g) | Yield (g) | NPGE DS | Substitution Efficiency |
|---|---|---|---|---|---|---|---|---|
| 35 | 12.4 | 3.5 | 1.58 | 0.50 | 2.63 | 15.5 | 0.059 | 24% |
| 36 | 12.3 | 2.3 | 1.85 | 0.49 | 3.10 | 13.1 | 0.025 | 10% |

*Number of moles of sodium hydroxide divided by number of moles of starting polysaccharide.

Examples 37 and B

Glycidyl Ethers Enhancement of Reaction Efficiency

A three pint, glass pressure reactor is charged with 25.0 g of wood pulp, 353.3 g of acetone, 60.8 g of ethanol and 36.0 g of water. The mixture is stirred for one hour while purging the head space of the reactor with nitrogen to remove any entrained oxygen. After 30 minutes, the reactor is warmed to 32° C.

While at 32° C., aqueous sodium hydroxide is added to the slurry under nitrogen. After stirring the slurry at 35° C. under nitrogen for one hour, the hydrophobic reactant specified in Table 3 and freshly distilled ethylene oxide in 16 ml of acetone are added. The reactor is sealed, and the mixture is heated at 75° C. for six hours.

The reactor is cooled to room temperature, and 18.75 g of glacial acetic acid is added. After stirring for 15 minutes, the polymer is isolated and washed as described in Synthesis Method A.

TABLE 3

| Example | Cautic (g) | Cautic Ratio[a] | EO (g) | EO Ratio[a] | Hydrophobe Type | Hydrophobe (g) | Hydrophobe DS | Hydrophobe Substitution Efficiency |
|---|---|---|---|---|---|---|---|---|
| 37 | 43.2[b] | 1.54 | 40.0 | 3.2 | NPGE | 10 | 0.007 | 3.0% |
| B | 47.5[c] | 1.54 | 47.5 | 3.8 | $C_{16}$ Epoxy | 15 | 0004[d] | 1.1% |

[a]Mole ratio equal to the number of moles per mole of wood pulp.
[b]22%
[c]20%
[d]Based on modified Zeisel method described in U.S. Pat. No. 4,228,277 and incorporated herein by reference.

The results in Table 3 show that despite using twice the molar charge of hydrophobic compound, the control Example B provided significantly less hydrophobic substitution as compared to the glycidyl ether compound in Example 37.

Examples 38–39

Latex Formulations and Evaluations Latex Paint Screening Formulation

Pigment Grind:

| Component | Pounds | Gallons |
|---|---|---|
| Water | 129.3 | 15.52 |
| PROXEL ® GXL (preservative) | 1.0 | 0.13 |

-continued

| Component | Pounds | Gallons |
|---|---|---|
| TAMOL ® 731 (dispersant) | 17.0 | 1.85 |
| PAG 188 (defoamer) | 1.8 | 0.25 |
| TERGITOL ® NP-10 (surfactant) | 1.0 | 0.11 |
| TiPure ® R-931 ($TiO_2$ pigment) | 150.0 | 4.95 |
| Satintone ® W (clay extender) | 125.0 | 5.81 |
| Camel Carb ® ($Ca_2CO_3$) | 150.0 | 6.45 |
| Water | 20.0 | 2.40 |

Let Down:

| Component | Pounds | Gallons |
|---|---|---|
| UCAR ® Latex 376 | 248.5 | 27.46 |
| Texanol ® (filming aid) | 7.9 | 1.00 |
| 28% aqueous ammonia | 2.1 | 0.25 |

-continued

| Component | Pounds | Gallons |
|---|---|---|
| PAG 188 (defoamer) | 1.8 | 0.25 |
| Designated Polysaccharide | 4–6* | 0.35–0.52 |
| Propylene glycol | 14.0 | 1.62 |
| Water | 261.8–263.2 | 31.43–31.60 |
|  | 1,136.6–1,137.2 | 100.00 |

*as set forth in concentration column of Table 4.
Density: 11.38 pounds per gallons.
Volume percent of solids: 31.3.
PVC: 55.1 volume percent of pigments.

TABLE 4

Characterization and Performance Data of Latexes

| Polysac-charide | NPGE DS | EO MS | 1% Visc. | Concen-* tration | Viscosity Stormer | Brook-field | ICI | Sag | Leveling | Spatter |
|---|---|---|---|---|---|---|---|---|---|---|
| HEC-4 | 0 | 3.5 | 400 | 4.0 | 77 | 32.00 | 0.75 | 12.0 | 6 | 1 |
|  |  |  |  | 6.0 | 97 | 62.50 | 1.05 | 16.8 | 4 | 2 |
| 1 | 0.012 | 3.6 | 485 | 4.5 | 89 | 32.5 | 0.9 | — | — | — |
|  |  |  |  | 6.0 | 100 | 49.5 | 1.2 | — | — | — |
| 2 | 0.015 | 5.0 | 391 | 4.5 | 79 | 30.4 | 0.9 | 13.0 | 6 | 1 |
|  |  |  |  | 6.0 | 95 | 47.2 | 1.2 | 21.0 | 4 | 3 |
| 3 | 0.007 | 4.6 | 155 | 4.5 | 74 | 27.8 | 0.8 | 11.8 | 5 | 1 |
|  |  |  |  | 6.0 | 86 | 42.1 | 1.1 | 17.2 | 4 | 1 |
| 4 | 0.016 | 4.5 | 1288 | 4.5 | 89 | 33.7 | 1.0 | 15.0 | 5 | 2 |
|  |  |  |  | 6.0 | 110 | 59.6 | 1.5 | 22.5 | 3 | 6 |
| 5 | 0.028 | 4.8 | insoluble | — | — | — | — | — | — | — |
| 6 | 0.012 | 3.5 | 545 | 4.5 | 80 | 34.7 | 1.0 | 15.2 | 6 | 1 |
|  |  |  |  | 6.0 | 98 | 54.9 | 1.4 | 24.0 | 5 | 3 |
| 7 | 0.018 | 4.7 | 661 | 4.5 | 83 | 32.4 | 1.1 | 15.6 | 4 | 2 |
|  |  |  |  | 6.0 | 100 | 50.4 | 1.3 | 21.0 | 3 | 5 |
| 8 | 0.026 | 3.5 | 1876 | (partly soluble) | — | — | — | — | — | — |
| 9 | 0.016 | 3.2 | 5140 | 4.5 | 92 | 40.0 | 1.1 | 18.4 | 4 | 2 |
|  |  |  |  | 6.0 | 111 | 63.3 | 1.5 | 24.0 | 3 | 5 |
| 10 | 0.022 | 3.7 | 221 | 4.5 | 70 | 13.3 | 0.9 | 12.0 | 6 | 1 |
|  |  |  |  | 6.0 | 83 | 30.6 | 1.2 | 17.2 | 4 | 4 |
| 11 | 0.022 | 3.7 | 2120 | 4.5 | 85 | 30.0 | 0.9 | 15.2 | 5 | 4 |
|  |  |  |  | 6.0 | 103 | 47.4 | 1.3 | 21.0 | 4 | 6 |
| 12 | 0.023 | 3.7 | 1148 | 4.5 | 79 | 25.4 | 1.0 | 12.8 | 5 | 4 |
|  |  |  |  | 6.0 | 97 | 38.6 | 1.3 | 20.0 | 4 | 5 |
| 13 | 0.031 | 5.0 | 321 | 4.5 | 76 | 21.7 | 0.80 | 8.6 | 7 | 4 |
|  |  |  |  | 6.0 | 91 | 34.85 | 1.15 | 13.0 | 5 | 5 |
| 14 | 0.026 | 3.1 | 147 | 4.5 | 69 | 9.01 | 0.80 | 8.5 | 7 | 4 |
|  |  |  |  | 6.0 | 83 | 34.25 | 1.05 | 11.8 | 6 | 4 |
| 15 | 0.018 | 3.2 | 643 | 4.5 | 79 | 32.9 | 1.00 | 11.8 | 5 | 2 |
|  |  |  |  | 6.0 | 92 | 46.48 | 1.20 | 15.6 | 4 | 3 |
| 16 | 0.026 | 5.3 | 415 | 4.5 | 78 | 24.75 | 0.85 | 9.6 | 6 | 4 |
|  |  |  |  | 6.0 | 93 | 39.35 | 1.10 | 13.2 | 4 | 5 |
| 17 | 0.017 | 3.1 | 930 | 4.5 | 78 | 32.50 | 0.90 | 13.6 | 6 | 1 |
|  |  |  |  | 6.0 | 94 | 50.10 | 1.30 | 18.4 | 3 | 2 |
| 18 | 0.016 | 3.6 | 105 | 4.5 | 65. | 15.16 | 0.85 | 10.6 | 6 | 4 |
|  |  |  |  | 6.0 | 75 | 31.60 | 1.15 | 13.6 | 4 | 4 |
| 19 | 0.021 | 5.0 | 193 | 4.5 | 72 | 23.70 | 0.95 | 11.8 | 5 | 4 |
|  |  |  |  | 6.0 | 88 | 36.0 | 1.20 | 16.4 | 4 | 4 |
| 20 | 0.016 | 4.9 | 50 | 4.5 | 64 | 9.58 | 0.75 | 9.8 | 6 | 4 |
|  |  |  |  | 6.0 | 73 | 30.30 | 1.00 | 13.2 | 5 | 4 |
| 21 | 0.018 | 4.3 | 140 | 4.5 | 68 | 13.60 | 0.85 | 10.6 | 5 | 4 |
|  |  |  |  | 6.0 | 80 | 33.70 | 1.20 | 12.8 | 4 | 4 |
| 22 | 0.019 | 3.7 | 241 | 4.5 | 70 | 37.05 | 0.85 | 8.6 | 7 | 4 |
|  |  |  |  | 6.0 | 85 | 37.55 | 1.10 | 14.4 | 5 | 4 |
| 23 | 0.021 | 4.8 | 295 | 4.5 | 74 | 23.15 | 0.80 | 10.6 | 6 | 2 |
|  |  |  |  | 6.0 | 90 | 39.90 | 1.15 | 15.2 | 4 | 4 |
| 24 | 0.021 | 3.7 | 502 | 4.5 | 74 | 24.50 | 0.90 | 10.6 | 7 | 3 |
|  |  |  |  | 6.0 | 91 | 40.20 | 1.25 | 17.6 | 4 | 5 |
| 25 | 0.018 | 3.7 | 306 | 4.5 | 69 | 22.25 | 1.00 | 10.6 | 6 | 2 |
|  |  |  |  | 6.0 | 85 | 38.45 | 1.50 | 15.2 | 3 | 3 |
| 26 | 0.028 | 5.0 | 1840 | 4.5 | 83 | 29.25 | 0.90 | 12.0 | 6 | 3 |
|  |  |  |  | 6.0 | 102 | 49.60 | 1.25 | 17.6 | 5 | 6 |
| 27 | 0.025 | 4.3 | 624 | 4.5 | 73 | 20.95 | 0.90 | 11.5 | 6 | 4 |
|  |  |  |  | 6.0 | 92 | 39.55 | 1.20 | 14.0 | 6 | 5 |
| 28 | 0.020 | 3.7 | 1580 | 4.5 | 83 | 25.50 | 0.80 | 11.6 | 7 | 3 |
|  |  |  |  | 6.0 | 100 | 43.0 | 1.30 | 15.6 | 5 | 5 |
| 29 | 0.019 | 3.6 | 1200 | 4.5 | 78 | 22.50 | 0.90 | 8.6 | 7 |  |
|  |  |  |  | 6.0 | 96 | 40.50 | 1.10 | 14.0 | 5 | 5 |
| 30 | 0.019 | 3.7 | 416 | 4.5 | 71 | 15.60 | 0.80 | 7.2 | 7 | 4 |
|  |  |  |  | 6.0 | 88 | 33.00 | 1.05 | 12.0 | 5 | 5 |
| 31 | 0.059 | 3.5 | — | — | — | — | — | — | — | — |
| 32 | 0.025 | 2.3 | — | — | — | — | — | — | — | — |
| 33 | 0.004 | 2.3 | 244 | — | — | — | — | — | — | — |
| 34 | 0.002 | 2.3 | 292 | — | — | — | — | — | — | — |

*Pounds of polysaccharide per 100 gallons of latex paint formulation.

What is claimed is:

1. An alkyl-aryl hydrophobically modified hydroxyethyl cellulose useful as an associative thickener in an aqueous protective coating composition, characterized in that the alkyl-aryl hydrophobically modified hydroxyethyl cellulose has a molecular weight of from about 15,000 to about 5,880,000 and a degree of alkyl-aryl substitution of from 0.09 to about 8.58 weight percent, said alkyl-aryl having from about 10 to about 24 carbon atoms.

2. The alkyl-aryl hydrophobically modified hydroxyethyl cellulose of claim 1 wherein the alkyl-aryl group is selected from the group consisting of nonylphenyl and dodecylphenyl.

3. The alkyl-aryl hydrophobically modified hydroxyethyl cellulose of claim 2 having a molecular weight of about 74,000 to about 1,200,000.

4. The alkyl-aryl hydrophobically modified hydroyethyl cellulose of claim 3 having a hydroxyethyl molar substitution (m.s.) of 3 to 5.

5. The alkyl-aryl hydrophobically modified hydroxyethyl cellulose of claim 3 wherein the alkyl-aryl substitution ranges from about 0.47 to 2.74 weight percent.

6. The alkyl-aryl hydrophobically modified hydroxyethyl cellulose of claim 1 wherein the alkyl-aryl comprises about 12 to about 24 carbon atoms.

7. An alkyl-aryl hydrophobically modified cellulose ether useful as an associative thickener in an aqueous protective coating, characterized in that the alkyl-aryl hydrophobically modified cellulose ether has a molecular weight of from about 15,000 to about 5,880,000 and a degree of alkyl-aryl substitution of from 0.09 to about 8.58 weight percent, said alkyl-aryl having from about 10 to about 24 carbon atoms.

8. The alkyl-aryl hydrophobically modified cellulose ether of claim 7 wherein the cellulose ether is water soluble and is selected from the group consisting of hydroxyethyl cellulose and hydroxypropyl cellulose.

9. The alkyl-aryl hydrophobically modified cellulose ether of claim 8 wherein the cellulose ether is hydroxyethyl cellulose.

10. The alkyl-aryl hydrophobically modified cellulose ether of claim 7 wherein the cellulose ether is methylcellulose.

11. The alkyl-aryl hydrophobically modified cellulose ether of claim 7, wherein the alkyl-aryl comprises about 12 to about 24 carbon atoms.

12. The alkyl-aryl hydrophobically modified cellulose ether of claim 11, wherein the alkyl-aryl is selected from the group consisting of nonylphenyl and dodecylphenyl.

13. The alkyl-aryl hydrophobically modified cellulose ether of claim 7, wherein the amount of alkyl-aryl hydrophobe is from 0.47 to about 2.74 weight percent.

14. The alkyl-aryl hydrophobically modified cellulose ether of claim 7, having an ether linkage connecting the alkyl-aryl hydrophobe and the cellulose ether.

15. The alkyl-aryl hydrophobically modified cellulose ether of claim 14, wherein the alkyl-aryl hydrophobe is an alkyl substituted with a hydroxyl group.

16. The alkyl-aryl hydrophobically modified cellulose ether of claim 15, wherein the alkyl-aryl hydrophobe is a glycidyl ether, reacted with the cellulose ether.

17. The alkyl-aryl hydrophobically modified cellulose ether of claim 16, wherein the alkyl-aryl hydrophobe is nonylphenyl glycidyl ether.

18. A water-soluble, hydrophobically modified cellulose ether characterized in that said cellulose ether comprises (1) from 1.5 to about 6 moles of an ether substituent per mole of cellulose repeat unit, (2) an alkyl-aryl substituent having from about 10 to about 24 carbon atoms in an amount of from 0.001 to about 0.1 moles of alkyl-aryl substituent per mole of cellulose repeat unit, and (3) from 50 to 20,000 cellulose repeat units per mole of cellulose ether.

19. The cellulose ether of claim 18 wherein alkyl-aryl substituent is selected from the group consisting of nonylphenyl and dodecylphenyl.

20. The cellulose ether of claim 18 wherein the amount of alkyl-aryl hydrophobe is from about 0.005 to 0.03 moles of alkyl-aryl substituent per mole of cellulose repeat unit.

21. The cellulose ether of claim 18 wherein the cellulose ether is hydroxyethyl cellulose.

22. The cellulose ether of claim 18 wherein the ether substituent is selected from: $-CH_3$, $-CH_2CH_3$, $-CH_2CH_6H_5$, $-C_{16}H_{33}$, $-CH_2CH_2OH$ and $-CH_2COOH$.

23. The cellulose ether of claim 18 which is nonionic or anionic.

24. A water-soluble, nonionic or anionic, hydrophobically modified hydroxyethyl cellulose characterized in that the degree of hydroxyethyl cellulose characterized in that the degree of hydroxyethyl substitution is from about 3 to about 5 moles per mole of cellulose repeat unit, the degree of hydrophobe substitution is from about 0.005 to 0.03 moles per mole of cellulose repeat unit, said hydrophobe comprising an alkyl-aryl group having from about 15 to about 18 carbon atoms, said hydroxyethyl cellulose having from about 250 to 4,000 cellulose repeat units.

25. The hydroxyethyl cellulose of claim, 24 wherein the alkyl-aryl group is nonylphenyl.

26. An alkyl-aryl hydrophobically modified hydroxyethylcellulose useful as an associative thickener in an aqueous protective coating, characterized in that the alkyl-aryl hydrophobically modified hydroxyethylcellulose provides a leveling value of not less than 7 and a sag value of not less than 12 and a Stormer Viscosity of not less than 83 KU.

27. The alkyl-aryl hydrophobically modified hydroxyethylcellulose of claim 26 wherein the hydroxyethylcellulose is ethyl group modified.

28. An alkyl-aryl hydrophobically modified cellulose ether useful as an associative thickener in an aqueous protective coating, characterized in that the alkyl-aryl hydrophobically modified cellulose ether provides, in an acrylic latex paint formulation, a leveling value of not less than 7 and a sag value of not less than 12 and a Stormer Viscosity of not less than 83 KU.

29. The alkyl-aryl hydrophobically modified cellulose ether of claim 28, wherein the cellulose ether comprises a water soluble cellulose substituted with a hydrocarbyl.

30. The alkyl-aryl hydrophobically modified cellulose ether of claim 29, wherein the water soluble cellulose comprises a member selected from the group consisting of hydroxyethylcellulose and hydroxypropylcellulose.

31. The alkyl-aryl hydrophobically modified cellulose ether of claim 30, wherein the water soluble cellulose is hydroxyethylcellulose.

32. The alkyl-aryl hydrophobically modified cellulose ether of claim 31, wherein the hydroxyethylcellulose is ethyl group modified.

33. The alkyl-aryl hydrophobically modified cellulose ether of claim 28, wherein the cellulose ether comprises methylcellulose.

34. The alkyl-aryl hydrophobically modified cellulose ether of claim 28, wherein the alkyl-aryl comprises about 10 to 24 carbon atoms.

35. The alkyl-aryl hydrophobically modified cellulose ether of claim 34, wherein the alkyl-aryl comprises a member selected from the group consisting of nonylphenyl and dodecylphenyl.

36. The alkyl-aryl hydrophobically modified cellulose ether of claim 28, comprising a spacer group between the alkyl aryl and the cellulose ether.

37. The alkyl-aryl hydrophobically modified cellulose ether of claim 36, wherein the spacer group comprises an alkoxy group.

38. The alkyl-aryl hydrophobically modified cellulose ether of claim 28, comprising an ether linkage connecting the alkyl-aryl hydrophobe and the cellulose ether.

39. The alkyl-aryl hydrophobically modified cellulose ether of claim 38, wherein the alkyl-aryl hydrophobe comprises a hydroxyalkyl radical.

40. The alkyl-aryl hydrophobically modified cellulose ether of claim 39, wherein the hydroxyalkyl radical comprises a hydroxypropyl radical.

41. The alkyl-aryl hydrophobically modified cellulose ether of claim 40, wherein the hydrophobe comprises a glycidyl ether, reacted with the cellulose ether.

42. The alkyl-aryl hydrophobically modified cellulose ether of claim 41, comprising a spacer group between the alkyl aryl and the ether linkage.

43. The alkyl-aryl hydrophobically modified cellulose ether of claim 42, wherein the spacer group comprises an alkoxy group.

44. The alkyl-aryl hydrophobically modified cellulose ether of claim 43, wherein the cellulose ether comprises hydroxyethylcellulose.

45. The alkyl-aryl hydrophobically modified cellulose ether of claim 44, wherein the hydroxyethylcellulose is ethyl group modified.

46. The alkyl-aryl hydrophobically modified cellulose ether of claim 45, wherein the alkyl aryl comprises nonylphenyl.

47. An acrylic latex paint formulation, comprising the alkyl-aryl hydrophobically modified hydroxyethylcellulose of claim 26.

48. An acrylic latex paint formulation, comprising the alkyl-aryl hydrophobically modified hydroxyethylcellulose of claim 27.

49. An acrylic latex paint formulation, comprising the alkyl-aryl hydrophobically modified cellulose ether of claim 28.

50. An acrylic latex paint formulation, comprising the alkyl-aryl hydrophobically modified cellulose ether of claim 32.

51. An acrylic latex paint formulation, comprising the alkyl-aryl hydrophobically modified cellulose ether of claim 38.

52. An acrylic latex paint formulation, comprising the alkyl-aryl hydrophobically modified cellulose ether of claim 45.

53. A vinyl acrylic latex paint formulation, comprising the alkyl-aryl hydrophobically modified hydroxyethylcellulose ether of claim 26.

54. A vinyl acrylic latex paint formulation, comprising the alkyl-aryl hydrophobically modified hydroxyethylcellulose ether of claim 27.

55. A vinyl acrylic latex paint formulation, comprising the alkyl-aryl hydrophobically modified cellulose ether of claim 28.

56. A vinyl acrylic latex paint formulation, comprising the alkyl-aryl hydrophobically modified cellulose ether of claim 32.

57. A vinyl acrylic latex paint formulation, comprising the alkyl-aryl hydrophobically modified cellulose ether of claim 38.

58. A vinyl acrylic latex paint formulation, comprising the alkyl-aryl hydrophobically modified cellulose ether of claim 45.

59. A latex paint formulation, comprising the alkyl-aryl hydrophobically modified hydroxyethylcellulose of claim 26.

60. A latex paint formulation, comprising the alkyl-aryl hydrophobically modified hydroxyethylcellulose of claim 27.

61. A latex paint formulation, comprising the alkyl-aryl hydrophobically modified cellulose ether of claim 28.

62. A latex paint formulation, comprising the alkyl-aryl hydrophobically modified cellulose ether of claim 32.

63. A latex paint formulation, comprising the alkyl-aryl hydrophobically modified cellulose ether of claim 38.

64. A latex paint formulation, comprising the alkyl-aryl hydrophobically modified cellulose ether of claim 45.

\* \* \* \* \*